United States Patent [19]
Wiedemer

[11] Patent Number: 4,635,081
[45] Date of Patent: Jan. 6, 1987

[54] APPARATUS AND METHOD FOR GENERATING DOT-MATRIX CHARACTERS IN GRAPHIC PATTERNS

[75] Inventor: Manfred Wiedemer, Ismaning, Fed. Rep. of Germany

[73] Assignee: Siemens Aktiengesellschaft, Berlin & Munich, Fed. Rep. of Germany

[21] Appl. No.: 628,717

[22] Filed: Jul. 9, 1984

[30] Foreign Application Priority Data

Jul. 8, 1983 [DE] Fed. Rep. of Germany ....... 3324758

[51] Int. Cl.⁴ .......................................... G01D 15/14
[52] U.S. Cl. ..................................... 346/160; 346/108
[58] Field of Search ......................... 346/76, 108, 160; 400/118, 119, 124; 358/296, 300, 302; 364/519

[56] References Cited

U.S. PATENT DOCUMENTS 4,234,931 11/1980 Kanaiwa et al. ................ 346/108 X
4,322,717 3/1982 Iida ................................. 346/108 X

FOREIGN PATENT DOCUMENTS 57-47676 3/1982 Japan .................................. 400/124

*Primary Examiner*—Thomas H. Tarcza
*Assistant Examiner*—Linda M. Peco
*Attorney, Agent, or Firm*—Hill, Van Santen, Steadman & Simpson

[57] ABSTRACT

An apparatus and method for generating characters using a dot-matrix printer for generating image dots having printing means which is moved along a recording medium in a line-by-line fashion, incorporates a matrix memory for storing a plurality of character fields of identical size made up of line-defining binary character element sequences. The character fields are read out from the matrix memory and are converted into drive signals for the recording means. Character fields containing displaceable character elements contain an identifier character. A recognition arrangement recognizes the presence of an identifier character in a character field, and selectively delays the drive signals for those character element sequences which are to be delayed. Each sequence to be delayed is identified as delayed by an identifier character.

7 Claims, 2 Drawing Figures

APPARATUS AND METHOD FOR GENERATING DOT-MATRIX CHARACTERS IN GRAPHIC PATTERNS

BACKGROUND

1. Field of the Invention

The present invention relates to dot-matrix printing apparatus for generating characters or graphic patterns, and more particularly to such apparatus having a print head which is moved along the recording medium on a line-by-line basis.

2. The Prior Art

With the increasing need for universal character layout, which is capable of printing in different fields, printing bar codes, graphics, etc., printers are more frequently being designed as dot-matrix printers. In contrast to printers having fixed type bars and the like, nearly any desired graphic characters can be produced on dot-matrix printers, to a desired degree of resolution, given programmable and electronically stored character sets.

The resolution of characters or graphics in a dot-matrix printer is limited by the size of the smallest printable unit, such as a dot. Factors which are involved are the geometrical dimensions of the dot, and the maximum writing frequency at a given printing rate. The necessary provision of electronic storage is also a consideration. High resolution is required in order to obtain a good printout clarity, particularly in a case of characters that have slants or curves as a part of the character shape. A resolution which is too low can produce a step-shape representation of characters and symbols.

Dot-matrix printers are known which have means for printing dots along a line in a single column, in which are driven in a response to binary signals from a character generator. The character generator provides drivng signals which are delayed in successive lines. Such apparatus is described in German patent OS 2,457,884.

Slanted lines can be formed in the printed characters by means of a delay means. In U.S. Pat. No. 3,333,208, a serial dot-matrix printer is disclosed in which the actuation signals for the print elements can be delayed by different time periods, as a function of the desired slant of the character to be printed.

BRIEF DESCRIPTION OF THE INVENTION

A principal object of the present invention is to provide an apparatus and method for generating characters or graphic patterns, using a dot-matrix printer, which enables the horizontal resolution of a graphic character to be increased, thus improving the printout clarity without increasing the writing speed, and without requiring any additional memory capacity. In one embodiment of the present invention, this object is achieved in a dot-matrix printer by providing character fields which contain displaceable character elements identified by identifier characters, and converting such identifier characters into drive signals for the addressing and control of the printhead, for generating an image point which is displaced relative to a line of the character being printed.

As a result of organizing the character elements into character fields, in which the individual character elements are identified by identifiers, it is possible to displace individual character elements as desired when printing, and thereby to optimize the print image. This is accomplished by control of a unit which addresses the memory, and which controls operation of the printhead, in accordance with the recognition of the identifiers.

Since most graphic characters do not occupy all memory cells of a character field, the unused cells can be employed for storing the identification characters. This is particularly true of the margin columns and margin rows of the character field, which are seldom occupied by dots to be printed, because of the required spaces between lines and characters.

In one embodiment, the character fields of the individual character elements are subdivided into a first group of character fields having displaceable character elements, and a second group of character fields having non displaceable character elements, with the two groups being distinguished by a group identifier. The first binary character of the first row and column of the character field can serve as the group identifier. With such an arrangement, the margin columns and margin rows in a character field can also be employed for storing character elements to be printed, in cases where there are no displaceable character elements provided inside the character field.

Such character fields having non displaceable character elements may represent strokes, curves, and special characters (for larger formats) which extend over a plurality of print locations or lines, taking up multiple character spaces.

When character fields are employed in which there is a maximum of one character element stored per column, that the first row of each column can serve as a binary character, then the arrangement of the present invention can take a particularly simple form, in combination with a first print register and a second delay print register. When printing, the character field is read out column-by-column, and immediately stored in both print registers. The delay print register is then read out, upon recognition of a character element to be displaced (as identified by an identifier), and the print register is read out for character elements that are not to be corrected.

In one embodiment of the present invention, the two groups of character fields can easily be distinguished from each other through the use of a first column register which performs logical operations with the matrix memory. The first column of each character field is read into the first column register, and a signal for the recognition of the binary character employed as a group identifier is generated by means of a simple combination of the first memory cell with a column clock for the first column.

BRIEF DESCRIPTION OF THE DRAWING

Reference will now be made to the accompanying drawings in which.

DESCRIPTION OF THE PREFERRED EMBODIMENT

Figure 2:
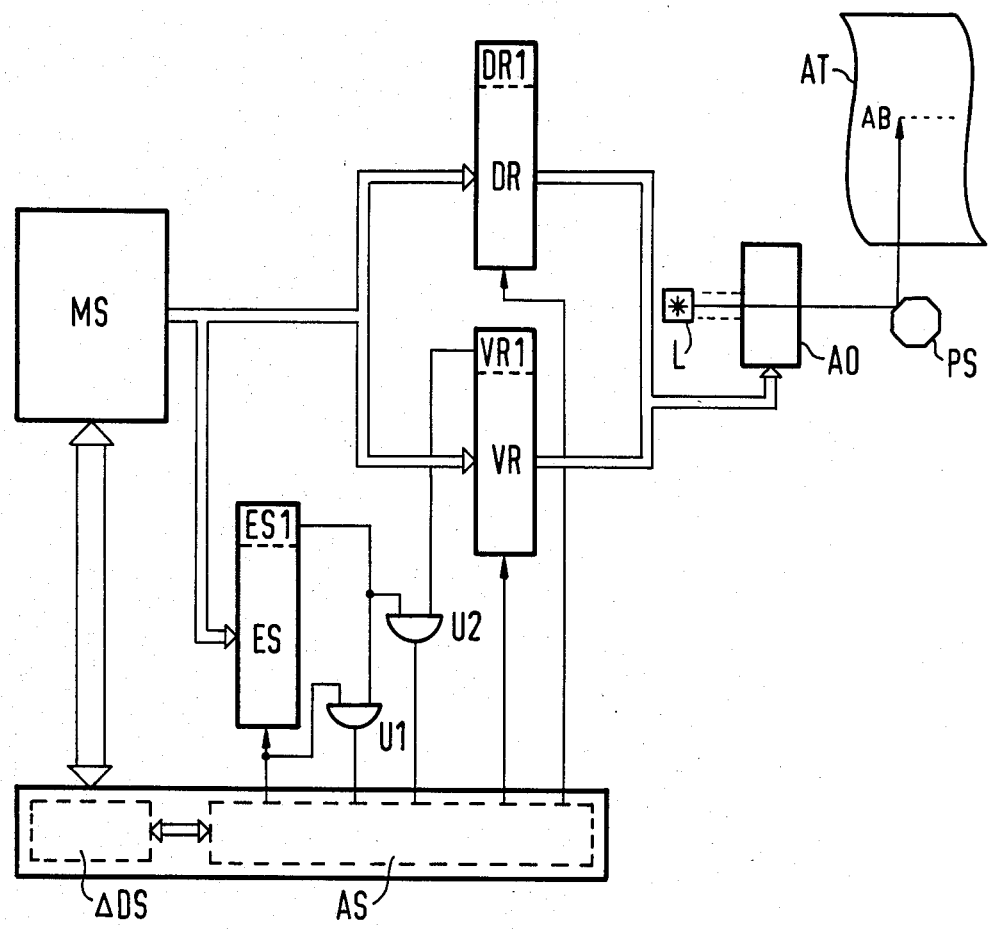
FIG. 2 is a schematic block diagram of an illustrative embodiment of the present invention incorporated with a laser printer.

Referring to FIG. 2, a laser printer such as the type described for example in U.S. Pat. No. 4,311,723, contains a laser source L, and acousto-optical deflector AO, a polygonal mirror PS, and a recording medium AT. The actual drive means for the laser printer is formed by the acousto-optical deflector AO which corresponds in principal to the printhead of a wire type dot-matrix printer. The drive of the acousto-optical deflector is controlled by apparatus which incorporates the present invention.

The matrix memory MS is provided for storing the individual characters as line-defining or pattern-defining binary character elements. The character elements are disposed in a line representing a column or row of a character field. Successive character fields are identical size and are each constructed in the form of a rectangular matrix. The matrix memory MS is driven by an addressing and control unit AS, which addresses the matrix memory MS in a known manner via an addressing means AS, and fetches a single line such as a column of the character to be represented from the matrix memory. It drives the acousto-optical deflector AO by means of a processing and recognition arrangement described hereinafter.

Figure 1:
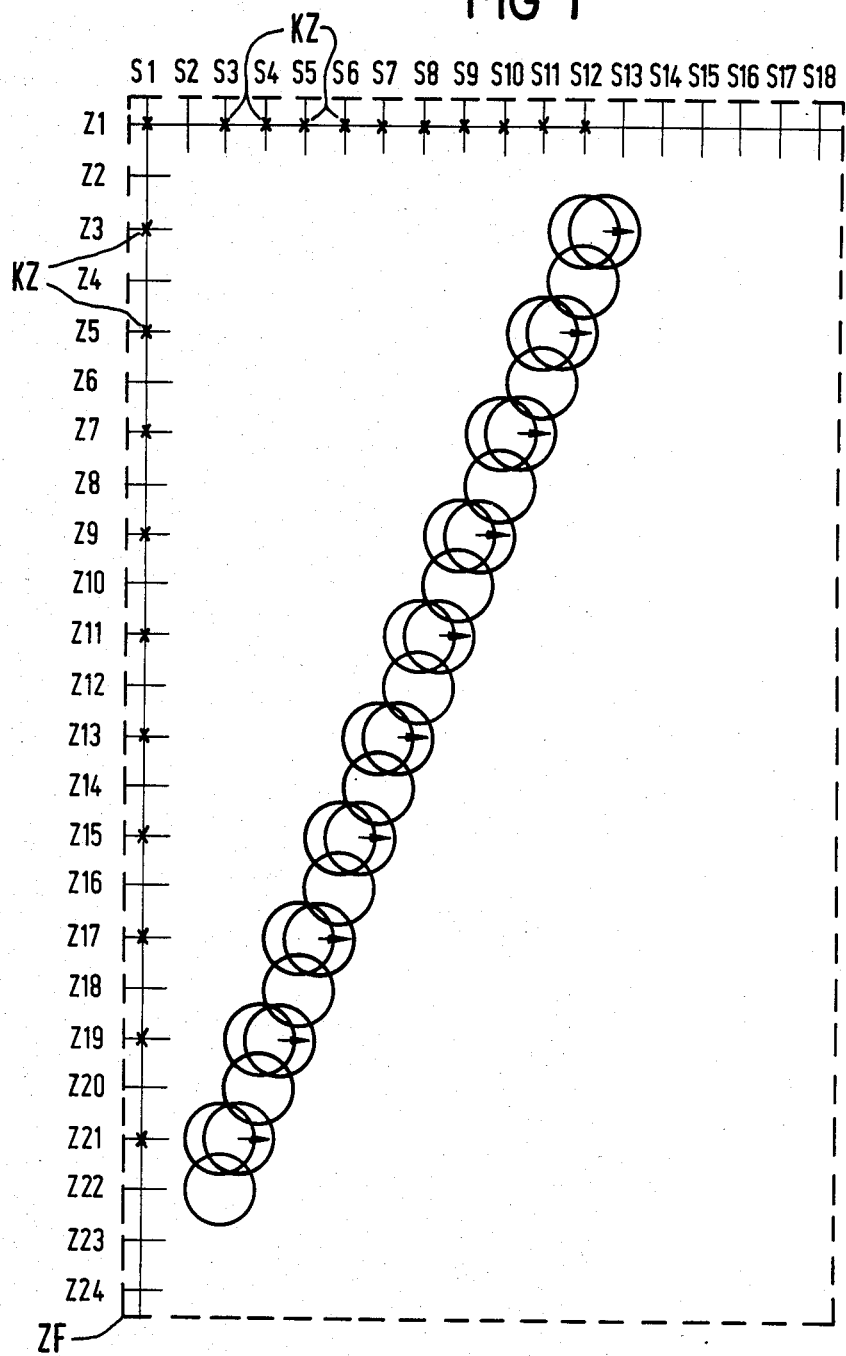
FIG. 1 is a schematic illustration of a character field made up of a plurality of character elements in positions indicated by horizontal and vertical coordinates.

The individual character elements to be represented are stored in the matrix memory MS in the form of binary characters in character fields ZF (FIG. 1 of identifical size). For example, for a character having the size 1/10 by 1/6 inches a character field has a resolution of 18 by 24 dots, corresponding to 432 storage positions. This is illustrated in FIG. 1 by the horizontal and vertical coordinates having 18 and 24 positions respectively. The character illustrated in FIG. 1 (a slash), is defined by the occupation of the appropriate storage positions within the character fields ZF. In order to obtain an optimization of the print image, with a smoothing of the character and the prevention of steps, individual character elements having the coordinates S12, Z3; S11, Z5; S10, Z7; etc., can be printed out in a delayed position, by suitably controlling the acousto-optical scanner AO. For this purpose, the control arrangement AS (FIG. 2) is connected with the matrix memory MS, to provide a displacement of the position of the character dots by an interval such as half a character space. As shown in FIG. 1, half of the dots making up the slash patter are printed in delayed position, to eliminate the steps which would be formed if such dots were printed in normal position.

In order to accomplish the displacement described above in a simple manner, the individual characters to be represented are stored within the matrix memory as two groups of character fields ZF which are distinguished according to whether character elements are to be displaced (or corrected). This is accomplished in the character fields by means of a group identifier GK which occupies the coordinate position Z1, S1 of the character fields ZF. When this cell is occupied with a binary "1", it indicates a character field containing character elements to be corrected. When this cell contains a binary "0", it indicates that there is to be no correction or displacement.

The identification of character fields by means of an identification bit which is referred to as a group identifier, enables characters that also occupy the first row and first column within the character field to be printed within a character set in accordance with the present invention. Such occupation is necessary when, for example, characters are to be printed which extend over a plurality of character fields such as continuous strokes. In this case, it is merely necessary to keep the first memory cell defined by the coordinates Z1, S1 free for the group identifier. It is also possible to store the group identifier outside the character field in a separate register in order to also be able to employ the storage positions Z1, S1 as a storage position for a character element in special cases, as needed. However, such an arrangment leads to a slight increase in the memory requirements.

In the example of FIG. 1, in which the character elements to be corrected or delayed are stored within the character field, the identification bits, referred to as the identification characters, are stored in the first column and first row of the character field for the identification of these character elements to be corrected by means of displacement. As a result of these identification bits, the printer control is informed that points lying in line with the identification bits are to be printed later in time, offset by half a spacing in the case shown in FIG. 1. The character fields are organized such that a maximum of a single character element is stored per column as 1 through S18. Accordingly, it is possible to deposit the identification characters only in the first row Z1 without ambiguities arising within the character field FZ. When a plurality of character elements are stored in a single column, this could lead to a undesired correction of a margin dot under certain conditions. In this case, correction of the dot is omitted. This takes into consideration the generation of a character shape and the corresponding correction location.

In the example illustrated in FIG. 1, the identification bits are disposed in the rows Z1 for identification of the character elements to be corrected. Alternatively, the identification bits may be stored in the column S1, or as a further alternative, both the first column and first row may be employed jointly as storage positions for identification characters in which a plurality of character elements are located in a single column. Correction of the character element by displacement can take place either in the row direction, or the column direction.

Referring to FIG. 2, a character to be printed is read from the matrix memory MS in a single line representing a column, under the control of the address and control means AS, for the drive of the acousto-optical deflector AL. The readout is synchronized with a clock signal generated by the addressing control unit AS, the frequency of which depends upon the desired writing speed. Upon readout of a character from the matrix memory, the corresponding character field ZF is first addressed, and transferred into a first column register ES, which stores all 24 bits of the first column S1 of the character field. A bit which is a binary "1" at the position ES1 of the first column register indicates that the characters stored in the character field ZF are to be printed in corrected or delayed fashion. This correction bit is recognized by operation of an AND gate U1 that receives one input from the bit stored at the storage position ES1 of the first column register ES, and second input from the clock signal drive from the unit AS. After the first column of the character field has been loaded into the first column register ES, two print registers DR and VR, connected to the matrix memory, are set by means of the addressing control unit AS. The print registers DR and VR have their outputs linked to the acousto-optical deflector AO, and serve as temporary storage units. When the first column register ES contains a binary "1" at the position ES1, no print information is located in the first row of the character ZF.

At the next clock pulse, the second column S2 is read out of the character field ZF stored in the matrix memory MS, and loaded into the print registers DR and VR. The registers DR and VR correspond in size and format to the first column register ES.

Either print register DR or the delayed print register VR is now selected, by means of the address and control unit AS, dependent upon whether the character elements stored in the print registers DR and VR is to be delayed, i.e., corrected. The drive for the delayed print register VR occurs slightly later in time, in comparison to the drive of the print register DR, the difference in time corresponding to half a column width, so that the displacement of the character elements to be corrected is delayed by half a column, as indicated by arrows in FIG. 1. The selection of which of the two print registers DR and VR should be sent to the acousto-optical deflector, is made on the basis of a comparison of the content of the first storage position VR1 of the delayed print register VR, with the content of the storage register ES1 of the first column registery ES by the AND gate U2. When the column stored in the print registers DR and VR contains a character element be delayed or corrected, then the identification character in the storage position VR1 and ES1 are both occupied with the binary "1". When both binary 1's are present, it indicates that the fetched character field ZF is one having characters to be corrected or delayed, and only the delayed print register VR is actuated for printing of columns when the output AND gate U2 is true. Subsequently, the column addresses are incremented by the next clock pulse, by means of the customary column counter for memory addressing, and the next column is fetched from the character field ZF stored in the matrix memory MS. When a new character ZF is addressed, after the first column is stored, a determination is made, using the output of the AND gate U1, that it is a character field in which no character element is to be corrected or delayed, when the storage position ES1 of the first column register ES is occupied with a binary "0". This condition is true for the duration of the character field. The drive of the acousto-optical deflector AO thereafter receives only the output of the print register DR. In this case, if a binary "1" is present in the first row position of any column of the character field, it is interpreted as a dot to be printed as one of the character elements in this column. Thus, with the exception of the first character ES1 of the first column of a character field, all bits stored at position DR1 of the print register DR are interpreted as dots to be printed.

In the illustrated example, the print register performs its writing in parallel for all 24 dots of a column. Alternatively, the present invention may be employed with apparatus in which the several dots making up a column are printed in subsets or serially.

In dot-matrix printer apparatus in which the horizontal writing speed can be increased, such as for example in laser printers, the combination of delayed dots with normally printed dots also makes it possible to select the line width in intermediate sizes such as a width of 1-½ dot diameters or 2-½ dot diamters, etc. By this means, an optimum matching is easily achieved machine readable graphic characters or bar codes, which have relatively narrow tolerances for their size and dimensions.

By the foregoing, the present invention has been described in sufficient detail to enable those skilled in the art to make and use the same. It will be apparent, however, that various modifications and additions may be made without departing from the essential features of novelty thereof, which are intended to be defined and secured by the apended claims.

What is claimed is:

1. Apparatus for generating characters or graphic patterns in dot-matrix form, including means for moving a recording means for generating image dots along a recording medium in line-by-line fashion, comprising, in combination, a matrix memory for storing a plurality of character fields of identical size in the form of binary sequences of elements each representing a single column or row of a pattern or character, drive means connected to said matrix memory for receiving said character fields, said drive means being connected to said recording means for supplying drive signals thereto, address and control means connected to said matrix memory for causing said matrix memory to read out a character field to said drive means, recognition means connected to the output of said matrix memory for recognizing an identifier character which identifies a character field containing displaceable elements, and means connected between said recognition means and said drive means for selectively delaying said drive signals in response to recognition of said identifier character, whereby the drive signals provided to said recording means are delayed in response to said identifier character and at least one of the dots produced in response to the character field associated with said identifier or character is displaced along the line of movement of said recording means, said character fields being stored in said matrix memory in the form of first and second groups of character fields, and each said character field incorporating a group identifier as said identifier character for identifying such character field as a member of the first or second group.

2. Apparatus according to claim 1, wherein the binary character at the location of the first row and column of each character field serves as said group identifier.

3. Apparatus according to claim 2, wherein the binary characters in the first row or first column of each character field serve as the group identifier for all other binary characters in that row or column.

4. Apparatus according to claim 2, wherein said drive means comprises first and second print registers for receiving each character field read out from said matrix memory, said address and control means causing said first print register to provide drive signals to said recording means at a first time, in response to nonrecognition of an identifying character, and for controlling said second print register for providing delayed drive signals to said recording means in response to recognition of said identifier character.

5. Apparatus according to claim 4, wherein said recognition means comprises a register for temporarily storing the first column of a character field which is read out from said matrix memory, and logic means connected to said temporary storage register for recognizing an identifier character.

6. A method for generating characters or graphic patterns employing a dot-matrix printer having a recording means for generating image dots which is moved along a recording medium in line-by-line fashion, comprising the steps of providing a plurality of line-representing sequences of elements for defining successive columns or rows of an entire character to be printed, providing an identifier bit for the character fields making up each of a plurality of character or graphic pattern to be printed, said identifier bit designating its associated character field as delayed or not delayed, and selectively delaying the drive signals provided to said recording means in response to the presence or absence of said identifier.

7. The method according to claim 6, including the step of providing an identifier character for each sequence representing a line or column, whereby the drive signals corresponding to elements of said sequence associated with said identifier in the same line or column are selectively delayed.

* * * * *